LASER—SHOCK TUBE COMBINATION

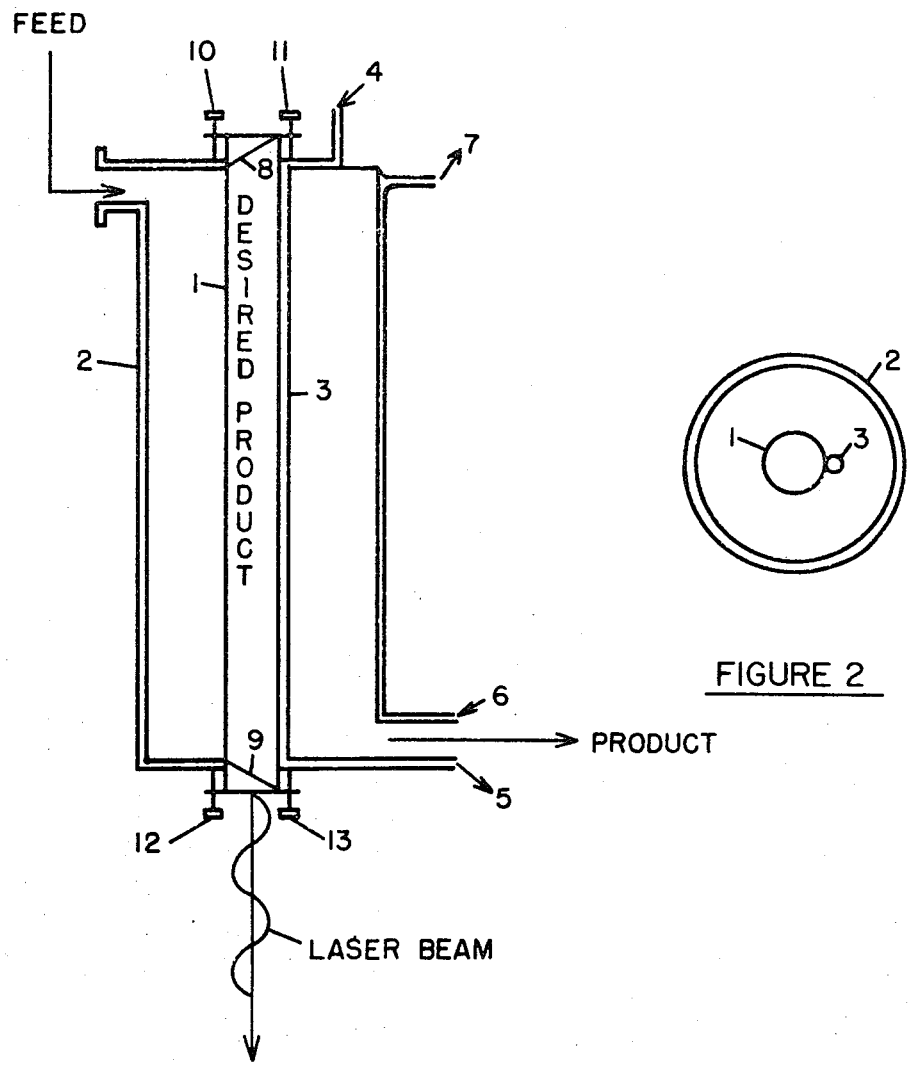

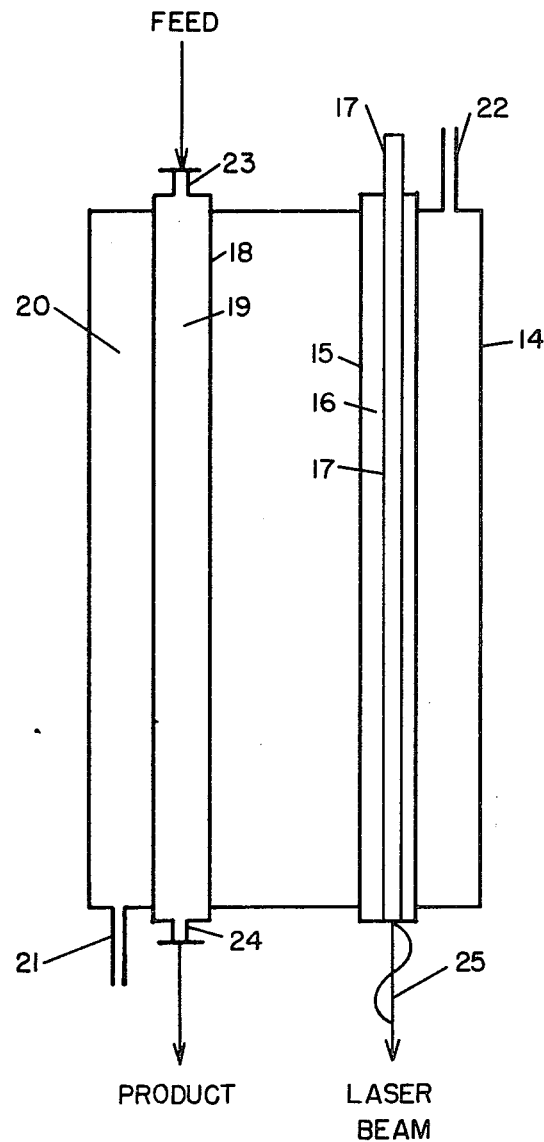
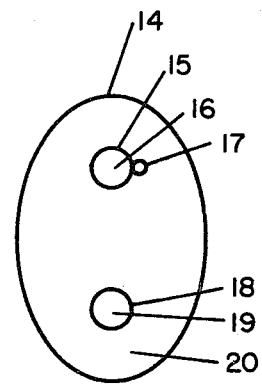
FIGURE 3
FIGURE 4

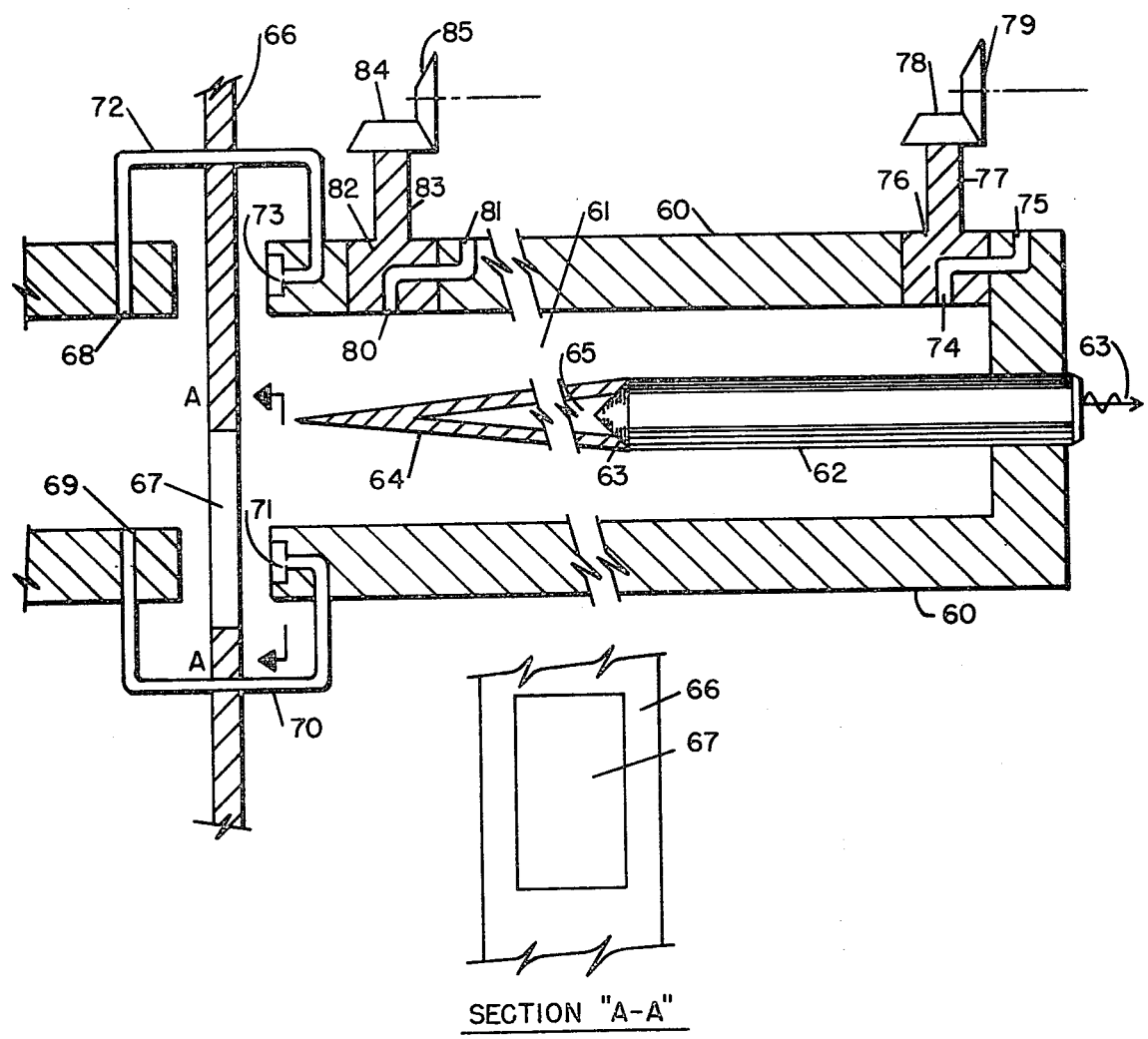

TOP VIEW

SIDE VIEW

United States Patent Office 3,719,454
Patented Mar. 6, 1973

3,719,454
LASER CONTROLLED CHEMICAL REACTOR
Jer-Yu Shang, Wilmington, Del., assignor to Sun Oil Company, Philadelphia, Pa.
Filed Jan. 19, 1970, Ser. No. 3,966
Int. Cl. H01s 3/00; B01j 1/10
U.S. Cl. 23—252 R 3 Claims

ABSTRACT OF THE DISCLOSURE

The invention involves a combination of a chemical reactor vessel and a laser cavity, said vessel having means for introducing a chemical reactant into said vessel, means for removing a reaction product from said vessel and means for recovering said reaction product in sufficiently pure form as to be a commercially valuable product, said vessel having a highly reflective interior surface and said laser cavity being coupled to said reactor whereby to enable the irradiation of said laser cavity by electromagnetic energy reflected from said surface and produced by a chemical reaction occurring within said vessel.

CROSS REFERENCES TO RELATED APPLICATIONS

The disclosure of the application of Jer-Yu Shang and William B. Hansel, Ser. No. 3,964 now abandoned filed of even date with the present application and titled "Apparatus for Irradiation of Laser Cavity," is hereby incorporated herein by reference, said Shang-Hansel application being assigned to the Sun Oil Company to whom the present application is also assigned.

The Shang-Hansel application discloses that a laser cavity incorporated with (e.g. enclosed within) an internal combustion engine or a wave reactor can be used to produce a rapidly pulsed laser beam by converting the luminosity associated with a shock front into laser light. An especially useful source of such mechanical energy for powering a wave engine is high pressure natural gas.

In the present invention, where the source of the shock wave can be a chemical reaction (such as combustion or the interaction of hydrogen and chlorine to produce (HCl)), the laser cavity can enclose a desired product or products of the reaction, thus causing the production in good yield of desired chemicals in addition to laser energy.

BACKGROUND OF THE INVENTION

The maser or the laser (optical maser) can be used to cause the ejection of energy from an excited molecule. The frequencies from laser radiation can be tuned to a finite range to excite certain portions of a given molecule and cause local excitation in a very short time interval. Then the excitation (vibrational and electronical) is transferred to another part of the molecule. This is known as relaxation phenomenon. Energy can be extracted from a reaction system by emitting the characteristic radiation from the final products in the form of laser action. This has been demonstrated by Dr. Irwin Wieder in Phys. Letters, 13, 759 (1967) (see also Chem. Eng. July 31, 1967, pp. 48, or Chem. Eng. News June 26, 1967). The Wieder device is operated by a technique called chemi-optical resonant pumping, whereby radiation from molecules newly formed in flames is absorbed by identical molecules physically separated from the combustion or reacting apparatus.

The Wieder device uses a tube of carbon dioxide gas in a laser cavity and radiation from a carbon monoxide/air flame. Continuous output of 1 milliwatt of infrared energy is reported. The carbon dioxide is contained at 0.3 to 1.3 torr in a quartz tube 4 meters long. Mirrors at each end of the tube have a 99.5% reflectivity for light at 10.6 microns, the wave length of a carbon dioxide laser beam. On two sides of the tube, and extending the full length of it, is a series of burners fed with carbon monoxide. When the carbon monoxide burns, carbon dioxide in a highly excited energy state results. Some of this energy radiates through the walls of the quartz tube to raise the entrapped carbon dioxide from the ground energy level to an excited state. Lasing results when photons are emitted from the excited carbon dioxide as it drops to a lower energy state.

One aspect of the present invention involves an improvement of the Wieder device, said improvement enabling the art to produce laser light and to recover a desired chemical product in sufficient purity as to be commercially valuable.

BRIEF DESCRIPTION OF THE INVENTION

In the present invention, energy at a given frequency is extracted from a chemical reaction by containing the desired final product or products of the reaction in a cavity or tube. In one embodiment the product in the laser cavity is kept separate from the reactants by a light-transmitting barrier (e.g. a quartz tube) and the chemical reaction occurs exterior to the laser cavity and is contained in a reactor the interior surface of which is highly reflective.

In another embodiment, there is no physical barrier between the reactants and the lasing product. In this embodiment the reactor can be a shock tube combined with a tape valve to separate a source of high pressure gas from the driver section of the shock tube, the walls of the shock tube being mirror-like and including a laser cavity in the region of the shock tube which is behind the reflected shock wave. This region can be determined by plotting the distance traveled by a shock front (in a shock tube) as a function of time (for example, see the previously cited copending application of Shang and Hansel).

One embodiment of the present invention is a combination of a chemical reactor vessel and a laser cavity, said vessel having means for introducing a chemical reactant into said vessel, means for removing a reaction product from said vessel and means for recovering said reaction product in sufficiently pure form as to be a commercially valuable product, said vessel having a highly reflective interior surface and said laser cavity being coupled to said reactor whereby to enable the irradiation of said laser cavity by electromagnetic energy reflected from said surface and produced by a chemical reaction occurring within said vessel.

Whole or selected parts of the reactant molecule, can be excited by supplying tuned radiation at a given frequency (which can be approximately calculated, but preferably is determined experimentally from spectral data) or simply in the presence of highly promotive elements, such as a catalyst, heat, or electrical discharge, to cause rigorous reaction outside an enclaved laser cavity which contains the desired final product.

The laser cavity containing the desired product can thus be utilized to extract the energy from an exterior reacting system at a frequency which corresponds to that of the energy differences involved in the desired reaction pathway. Thus, energy can be injected and/or extracted in the form of radiation of defined frequencies.

In any event, a major energy transfer process in the present invention is the removal from the reactor/laser system of quantized energy of a specific wave length. One aspect of the present invention involves the use of such energy removal to enhance production of desired products of a chemical reaction and the recovery in relatively pure form of such desired products.

In accordance with the reaction kinetic theory of potential fields, the application of the aforementioned technique of injecting and extracting energy at specified frequencies from a confined chemical reaction will force the reaction in a guided direction and result in nearly complete conversion of reactants into desired products.

The application of the aforementioned technique of injecting and extracting energy can change the terrain of the potential energy surface and cause a more complete conversion of reactants into desired products. This unique feature of the present invention can reduce the energy required in a conventional reactor unit. Because undesirable by-products are considerably decreased, it also can drastically cut down the operational costs of separation and recycling of reactor effluents. Highly pure products can thus be produced at a decreased cost.

For example, in a modern petroleum refinery the more important operations are based on such chemical reactions as cracking, reforming, isomerization, hydrogenation, and alkylation. However, the separation facilities required to separate the desired products of these reactions from by-products and the unconverted portion of the feed require a substantial amount of capital investment.

Employment of the present invention to petroleum refining processes can greatly reduce operational and capital investment. The costs can be reduced by recovering energy from the emission of radiation from the product laser beam.

A material which can emit energy at about the same wave length as that emitted by the lasing desired product (i.e., the wave length emitted by the metastable stage, or state of the desired product) can be enclosed or temporarily confined in the laser cavity as a whole or partial substitute for the desired product. Such a substitute for the desired product within a laser cavity is an equivalent of the desired product where so utilized in the present invention.

DESCRIPTION OF DRAWINGS

FIGS. 1 and 2 illustrate a basic configuration for a reactor system in which the lasing of the desired product is utilized to control the reaction products of a given chemical reaction.

Figure 5:
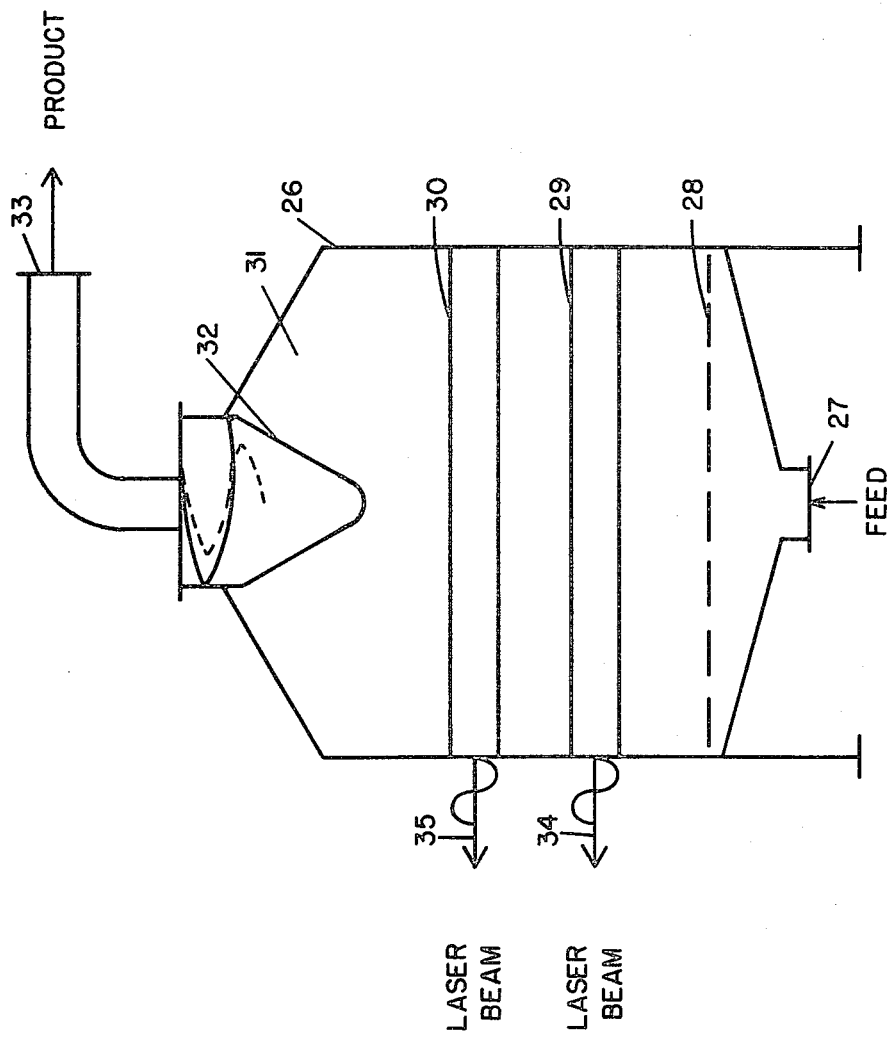

A laser is a device that converts different forms of energy into a concentrated beam of coherent electromagnetic radiation. When a system is in thermal equilibrium, most of the atoms occupy the lowest possible energy levels, i.e. they are in the "ground state." Atoms in the ground state can be excited to higher energy levels by pumping, i.e. by causing them to absorb energy from some external source. An atom in such an excited state may then relax to a lower energy state, known as the metastable state, by releasing some of the absorbed energy. A second energy release, wherein the material goes from the metastable state to the ground state is the energy which can be transformed to a laser beam. For such an energy transfer to result in a laser beam, it is necessary to have an active laser material, an optically resonant cavity, and means whereby external energy can excite the laser material. When sufficient energy is absorbed by the material, its energy characteristics change and it becomes an emitter of coherent electromagnetic radiation. For example, in a gas laser the output can be continuous and the discharge is made directly in the laser material.

Stimulated emission is the process which occurs when the light emitted from one atom interacts with another atom that is still in the excited state. The interaction triggers the excited atom into releasing its own extra energy as light. Such stimulated emission always has the same wave length as the triggering light and travels in the same direction, thus combining with and amplifying the triggering light.

In the embodiment of the present invention illustrated by FIGS. 1 and 2, the desired product, in the course of the chemical reaction occurring in the outer reactor 2, exists in a metastable state and, in order to produce the desired product, this metastable state must release energy. In the present invention this energy is captured by a portion of the desired product which is contained in a laser cavity 1 enclosed within the outer reactor. This absorption of energy by the desired product within the laser cavity results in a laser beam being produced and, thus, removal of energy from the reacting system.

Another means of utilizing the lasing process to control the product of a chemical reaction is to cause the desired product within the laser cavity to lase, by exposing it to external irradiation (as from a chemical reaction which evolves light) and then to introduce reactants into the laser cavity containing the desired product while simultaneously removing a proportionate amount of the desired product. In such a reactor the flow rates can be controlled such that the withdrawn product is in a highly pure state. Alternatively, recycle can be used to increase yield and purity. When the laser cavity is within an internal combustion engine, the lasing of $CO_2$ can be so utilized to effect substantially complete combustion of hydrocarbon (with at least stoichiometric quantities of oxygen) to carbon dioxide and water, with virtually no carbon monoxide formation.

This removal of energy causes the chemical reaction which is occurring within the chemical reactor to be controlled in a manner such that the product of the chemical reaction is the desired lasing product which is contained in the laser cavity. That is, by removal of energy corresponding to that required to go from the metastable state to the ground state of the product, the chemical reaction has been controlled and caused to produce the desired product rather than undesired side-products. In effect, removal of this specific energy changes the reaction kinetics. In other words, the energy level involved in the chemical reaction matches the energy level involved in the lasing process, thus directing the product of the reaction.

In such a chemical reactor system it is preferred that there be means for controlling the temperature of the desired product within the laser cavity, such as by a heat exchange conduit or tube 3. Preferably, the heat exchange conduit has a mirrored external surface. Further preferred are means for controlling the temperature of the reacting chemicals in the outer reactor vessel 2, such as by having a hollow-walled vessel for reactor 2, and introducing a cooling medium which enters the outer wall at conduit 6 and, after circulating through the vessel, is removed to an external heating exchanger (not shown), as by conduit 7. Similarly, the heat exchange of the desired product within the laser cavity can be effected by pumping a heat exchange fluid via conduit 4 through a heat exchanger 3 and removing the heat exchanged fluid to an external heat exchanger (not shown) through conduit 5.

In one embodiment of a laser cavity, the outer walls of the cavity 1 are of a material which is capable of transmitting radiation from the reacting system in the outer reactor into the cavity containing the desired product. For example, where the walls of the lasing cavity are of quartz, radiation in the infrared through the ultraviolet range can be transmitted from the reaction mixture to the desired product.

In one form of a laser cavity, a quartz tube contains two mirrors, 8 and 9, the mirror 9 being slightly less efficient (e.g. 99.5% reflective) as a reflector (for the desired wave lengths) than the mirror 8, thus allowing the transmission of a laser beam through mirror 9. It is also preferred in one embodiment of such a laser cavity that the mirrors can be adjusted, as by adjusting screws 10, 11, 12 and 13. On configurations of optical cavities, see Garret, C.G.B., Gas Lasers, McGraw-Hill (1967), especially pp. 15–37. Means disclosed therein for further manipulation of a laser, such as Q switch pumping, can also be utilized in the present invention.

FIGS. 3 and 4 illustrate a preferred embodiment of the reactor of FIGS. 1 and 2, wherein a laser cavity containing the desired product is positioned at the focal point 19 of an eliptical container 14, the interior surface of which is highly reflective. The reactor vessel 15 is positioned at one focal point, 19, of the ellipse and the laser cavity is at the second focal point of the ellipse, 16.

The laser cavity preferably has affixed thereto a heat exchanger tube 17. Additional heat exchange of both the reacting system within the tube 18 and of the laser cavity can be effected by pumping a heat exchange medium through conduit 22 into the elliptical vessel 14 and removing the heat exchange medium to an external heat exchanger (not shown) as through conduit 21. If the exterior of the heat exchange conduit is not mirrored, the heat exchange medium and the conduit are preferably at least partially transparent to radiation in the infrared through ultraviolet range in order that energy can be transferred through them from the reacting system 19 to the laser cavity 16. Although the illustrated conduit is a tube coaxial with the tubular reactor, other configurations (as a spiral or helix) can be used.

Another embodiment is shown in FIG. 5, wherein a desired chemical reaction is effected in a fluidized bed of catalyst (or of solid reactant). The feed in vapor phase enters the bed through the bottom of the reactor 27 and interacts with a suspended, finely powdered solid catalyst which, as by means of a perforated distribution plate 28, is intimately admixed with the gaseous feed reactants. In the course of the reaction, the metastable form of the product emits radiation in the vicinity of a plurality of laser cavities 29 and 30 which contain the desired reaction products. Thus, laser radiation 34 and 35 is produced and the reaction is caused to produce the desired product. A cyclone 32 can be used to separate the solid catalyst particles from the desired reaction product in the reactor, which can be removed from the system by conduit 33.

This embodiment can be used to produce chlorinated hydrocarbons by feeding the hydrocarbon (e.g. ethylene) and ferric chloride vapor (at 315–500° C.) into the reactor and by containing a desired chlorinated hydrocarbon (e.g. ethylene dichloride) in the laser cavity (regarding such ferrichlorination see Ser. No. 621,379 of Borkowski and Van Venrooy, filed Jan. 23, 1967).

The reactor of FIG. 5 can also be used to interact a gaseous reactant and a finely divided solid, as to produce $CO_2$ and a laser beam from oxygen (or air) and powdered carbon. If the finely divided solid is a powdered dessicant, (such as a molecular sieve zeolite), this reactor can also be used to remove water from reaction systems (such as combustion of hydrocarbons) in which water is a product. Such removal of water can increase the efficiency of the conversion of chemical energy since water molecules can absorb such energy and, thus, hinder its transfer to the laser cavity. The water can be removed from spent desiccant by transferring the spent desiccant to a separate regeneration zone or reactor.

Where the reactants comprise powdered carbon (which can be "industrial coke" of which 95+ weight percent, will pass through a 200 mesh screen) and oxygen (e.g. air), the fluidized bed can be stabilized by incorporation therein of inert solids (e.g. sand, clay, spent cracking catalysts) which can serve as a heat transfer medium, especially to hasten the heating of carbon and air to combustion temperature and to insure even combustion. The upward flow of fluidized inert solid can be regulated so as to cause the combustion flame front to occur in the proximity of the $CO_2$-containing laser cavity. The weight percentage of such inert material based on the feed carbon is preferably in the range of 5 to 99.

A particularly useful embodiment utilizes "coked" silica-alumina cracking catalyst (including "mole sieve" zeolite-promoted catalyst) as a combined fuel source and heat transfer medium. For purposes of the present invention, highly condensed hydrocarbonaceous material, such as "coked" catalyst or coal, is an equivalent of "powdered carbon" as a reactant.

In one embodiment air and carbon powder (or coked fluidized cracking catalyst) are introduced at the bottom of the fluidized bed and the bed flow and temperature are regulated such that combustion occurs primarily in the upper portion of the bed, and in the vicinity of at least one laser cavity. Exhaust gases are removed from the top of the fluidized bed.

The temperature of the carbon powder flame inside such a combination of a laser cavity and a fluidized bed reactor can be controlled by the oxygen-solid diluent ratio. When the laser cavity is in an enclosure, the inert material inside the fluidized bed preferably should be the same material which is used for the enclosure (or plasma tube) of the laser, for example, quartz (for a $CO_2$ laser) or high melting point, low abrasive material. The carbon powder to be used in the fluidized burner is preferably low in ash content in order to reduce dust generation. The dust tends to deposit on the surface of the $CO_2$ laser tube and reduce energy transfer to the cavity. Provisions can be made (e.g. by mechanical arrangements) to allow periodical replacement and/or cleaning of the laser tube.

The brewster windows and mirrors of the laser cavity are preferably placed outside the reach of the flames. This arrangement can have a low maintenance cost, the major cost involved being for replacing internal laser tubes.

The internal surface of the fluidized bed reactor is preferably highly polished to permit the maximum collection of radiation energy by the $CO_2$ laser.

Figure 6:
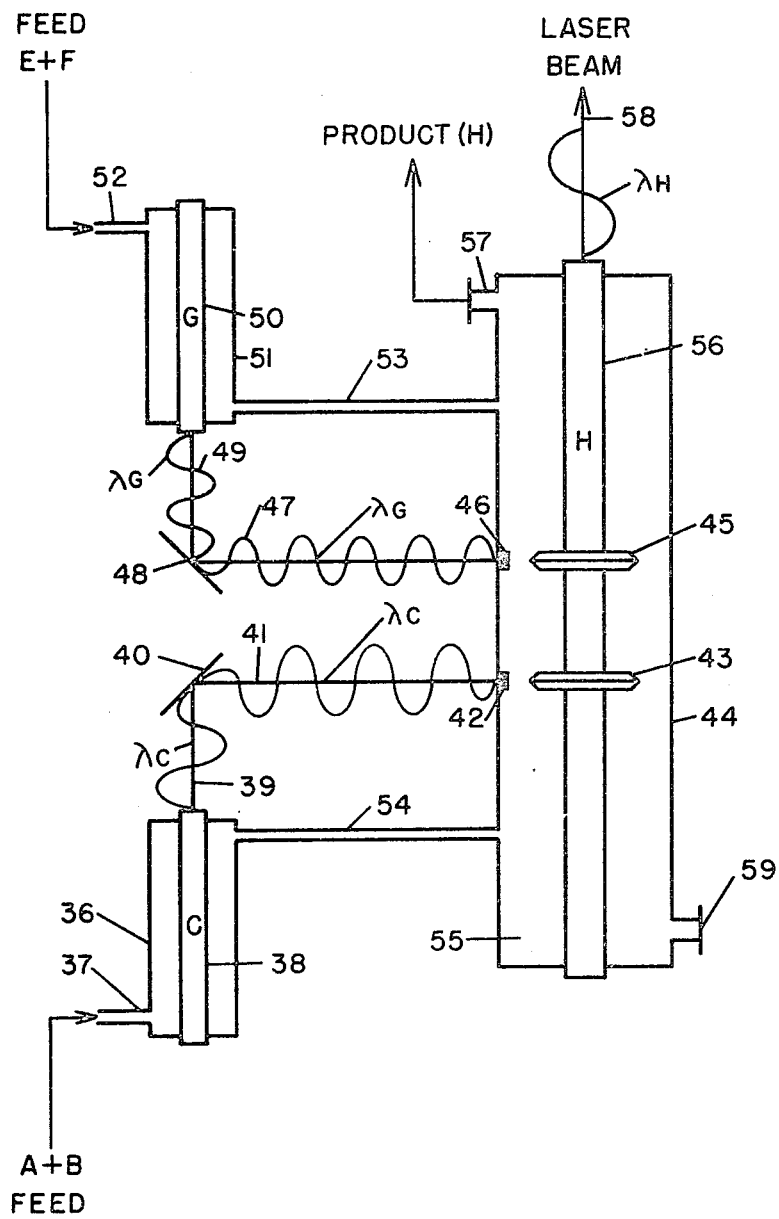

FIG. 6 illustrates a laser reactor complex. The desired product of the complex is product H. However, the desired reactants to produce product H are $A+B$ and $E+F$. In the complex, two reactor systems, which can be similar to that in FIGS. 1 and 2, are utilized. In one reactor system 36, components A and B are fed into a reactor 37 which has a highly reflective inner surface and encloses a laser cavity 38 containing a desired product C. The products of this laser-reactor system are desired product C, which is transferred through conduit 54 to the main reactor 44, and a laser beam C, corresponding to the wavelength emitted by the metastable state of reactant C. This laser beam is transmitted, as by means of a reflecting mirror 40 through a transparent port 42 into the main reactor 44. Preferably the laser beam 41 is deflected by a replaceable deflecting member 43, in order to reduce local heating of the walls of the laser cavity.

Similarly, reactants E and F are transported, via a conduit 52, into reactor 51 which encloses a laser cavity 50 containing desired product G. Laser radiation corresponding to that emitted by the metastable state of product G is emitted from the laser and transferred, as by mirror 48, into the main reactor 44 (via light transmitting port 46) and is deflected by a deflector 45. The product G is transferred via conduit 53 into the reactor 44. Within the reactor cavity, 55, products G and C interact and emit radiation which is absorbed by the desired product H, in laser cavity 56, to produce a laser beam 58 corresponding to the energy emitted by the metastable state to produce product H, and the desired product of the reaction is removed from the reactor vessel via conduit 59 and recovered.

For example, in reactor systems 36, the feed can be nitrogen monoxide and oxygen, at flame temperature, about 2000° C., and the desired product in the laser cavity is $NO_2$. Thus, in reactor 36, the reaction, $$2NO + O_2 \rightarrow 2NO_2$$

will occur and relatively pure $NO_2$ can be fed to the main reactor 44. Concurrently, in reactor system 51 acetylene is the feed, the temperature about 600° C., and, by the reaction, 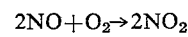 benzene the product (which is fed to reactor 44). In the main reactor 44 hydrogen and nitrobenzene are the products which can be recovered (and nitrobenzene is enclosed in the laser cavity).

By feeding oxygen into the wave reactor, natural gas can be converted to useful products (such as ethene or propylene). Alternatively, fluorine gas can be fed into the wave reactor and caused (by the shock excitation) to react with the dry gas to produce fluorinated hydrocarbons and HF. The light from such shock-excited chemical reactions can be utilized to produce laser light and, such lasing of a desired chemical product can be used to improve the yield of the desired product.

The aforementioned application of Shang and Hansel involves irradiation of an irradiable target (e.g. a laser cavity) with electromagnetic energies covering the region between approximately the infra-X-ray and the trans-infrared portions of the spectrum by means of the system which comprises: light associated with a shock wave front (e.g. produced within an internal combustion engine) aligned to strike a movable member having a mirror-like surface and also an aperture in spaced relation to said surface (e.g. a mirrored tape valve) and means for moving said member at a speed such that said light strikes the mirror-like surface and said movable member whereby to provide via said movable member a light-coupling between said target and light source.

In FIGS. 7 and 8 there is illustrated a combination of a laser cavity and a wave reactor and/or engine and includes, as valving means, a tape valve to valve the various materials to and from the reactor conduit in the proper sequence, and at the proper times. This invention can be used to produce a rapidly pulsed laser and also produce desired chemicals. That is, it can convert a portion of the mechanical energy of a high pressure gas into light and heat which can excite reactants. The light produced by the gas and by the excited reactants can be converted into laser light in a quasi continuous fashion and a desired chemical product can be recovered.

In FIG. 7, a shock tube 60 encloses a laser cavity 62 which, preferably, contains a desired product of a particular chemical reaction (such as $CO_2$ as from the reaction $CO + \frac{1}{2}O_2 \rightarrow CO_2$). In the wave reactor a pressure differential exists on opposite sides of a metal tape 66. To the left of the tape is a source of higher pressure gases than on the right of the tape. Tape 66 moves, as by oscillation, such that the orifice A—A alternately allows the high pressure gas on the left to enter the shock wave tube. For further description of the wave engine or wave reactor see U.S. Pat. 3,300,283 of Lauer et al., issued Jan. 24, 1967; 3,307,917 of Hansel et al., issued Mar. 7, 1967; U.S. Pat. 3,357,797 of Hansel, issued Dec. 12, 1967; U.S. application Ser. No. 721,001, filed Apr. 12, 1968 of Hansel, now U.S. 3,500,862, issued Mar. 17, 1970; U.S. Pat. 3,307,918 of Bodmer et al., issued Mar. 7, 1967; U.S. Pat. 3,355,256 of Hansel, issued Nov. 28, 1967; and U.S. Pat. 3,384,117 of Hansel, issued May 21, 1968.

Critical flow orifices 68 and 69 allow equilization of the pressure to the left such that gases emerging through ports 71 and 73 prevent the metal tape 66 from rubbing against the shock tube. The gases producing the shock wave, can be vented from the shock tube by the beveled gear system, 85 and 84, which activates a stop-cock arrangement for venting of the driven gas. Similarly, the driven gas is vented through the stop-cock arrangement 74 and 75 which is activated by the beveled gear arrangement 78 and 79.

When the high pressure gas enters through the orifice A–A into the right-hand side of the chamber (the shock tube), an expansion wave meets a shock wave in the region between the ports 74 and 80. The region behind the reflected shock wave contains highly excited gases. These excited gases pass from the excited state to a metastable state and, in passing from the metastable state to ground state, produce radiation which causes lasing of the laserable material in the laser cavity 62 resulting in the production of a laser beam 63. In the coaxial position with the shock tube portion of the reactor (as illustrated in the drawing), an enclosed laser cavity can be protected by a replaceable nose cone 64 or by arrangements described by Laderman et al., Applied Optics, vol. 8, No. 8, 1743–5 (1969). The laser cavity can also be coaxial with the shock tube portion of the reactor.

The aforementioned application of Shang and Hansel involves irradiation of an irradiable target (e.g. a laser cavity) with electromagnetic energies covering the region between approximately the infra-X-ray and the trans-infrared portions of the spectrum by means of the system which comprises: light associated with a shock wave front (e.g. produced within an internal combustion engine) aligned to strike a movable member having a mirror-like surface and also an aperture in spaced relation to said surface (e.g. a mirrored tape valve) and means for moving said member at a speed such that said light strikes the mirror-like surface and said shock wave front passes through said aperture; an irradiable target optically coupled to said mirror-like surface and said movable member, whereby to provide via said movable member a light-coupling between said target and light source.

Figure 9:
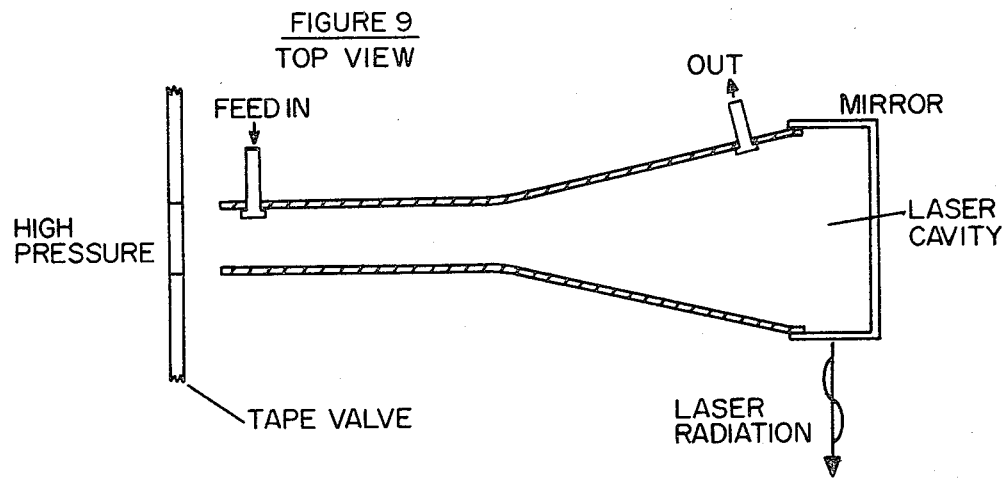
Figure 10:
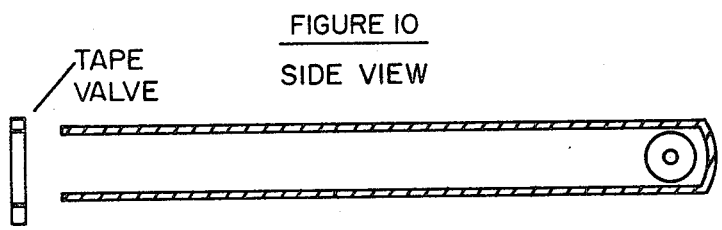

FIGS. 9 and 10 illustrate a laser-shock tube (or wave reactor) combination wherein the laser cavity is not a separate enclosure but is an integral part of the shock tube (or shock conduit). That is, the portion of the shock tube behind the reflected shock wave is converted into a laser cavity. This is accomplished by mirroring two opposite sides (or areas) of the interior of the shock tube in the end portion behind the reflected shock wave.

One front-coated mirror is made partially transmitting for the desired wave length of laser light (e.g., 99.5% reflection); thus, causing lasing of the excited substances in that region (which preferably are gases, but which can include liquids and finely dispersed solids). In this embodiment the shock wave front acts as a temporary barrier which keeps the excited substances within the laser cavity for sufficient time to permit lasing to occur.

This laser-shock tube combination, wherein the laser cavity is an integral part of the shock tube, allows the conversion of chemical energy to laser light by collision processes in addition to conversion of light transmitted by radiation from excited molecules (or atoms).

Certain embodiments of the present invention (such as those illustrated in FIGS. 7, 8, 9 and 10) can utilize a continuous shock wave generator (e.g. a wave reactor), which is actuated by a fast opening-closing valve, such as the tape valve of W. B. Hansel's United States patent application Ser. No. 721,001 (the disclosure of which is incorporated herein by reference).

The Hansel tape valve is an impervious tape which is driven at a high velocity between two aligned portions of a gas flow passage, the tape moving transversely with respect to the length of the pasage. The tape has an aperture therein which comes into registry with the two passage portions to permit communication therebetween for opening of the valve. The tape is maintained centered in a small gap between the juxtaposed passage portions, as the tape moves, by the application of (oppositely-acting) gas pressures to the respective opposite faces of the tape.

The basic principle of the tape valve involves the use of a number of critical flow orifices behind the tape, opposite to the high pressure side of the tape valve. These critical orifices generate sufficient back pressure to counterbalance the pressure from the high pressure side. The tape valve can have a self-acting servomechanism to keep the tape from coming unduly close to the sides, at the two sides of the tape. A mechanical valve mechanism synchronized with the tape can permit the reacted gases to escape and be collected as final products.

There are many natural gas wells in the western part of Texas and in the North Sea, off Great Britain. These wells generate high pressure gases which can be used as a mechanical energy source in the continuous shock wave reactor and which can be converted in the reactor to more salable products.

rate at which a given laser beam can penetrate a particular depth of a known formation, a relationship can be obtained which can be used for analysis of unknown formation. The basic data for such a correlation can be obtained by utilizing a laser to drill a hole adjacent to a well which has been drilled by conventional methods and from which certain samples were obtained at various depths.

An additional and important utility which can be obtained by combining a laser cavity and a wave engine or wave reactor of the types illustrated in FIGS. 7 and 9, is in the field of long-range communication. That is, the rate of movement of the tape valve and the size and spacing of the openings in the tape can be utilized to control the amount and timing of the pulses of laser energy emitted and, if this energy is directed at a suitable receptor (or reflector that is directed at a receptor) the amplitude, quantity and patterning of the pulses of laser energy can be translated by the receiver into a message. One such type of programming of the tape could involve a simple code, such as the Morse code.

Another could involve transmission of coded laser light by actuation of the tape valve by coded electric impulses, as from magnetic tape, and translation of the laser light on the receiving end (as a photoelectric cell) back into electric impulses. Such laser communication could be of great utility when the laser is directed at an orbiting satellite which can reflect the laser energy back to a given point on earth. Another utility would be to transmit messages to a reflector or receiver on the moon.

ILLUSTRATIVE EXAMPLES

Example 1

Thiazine can be produced by either one, or a combination of the following chemical reactions:

(1)                 $2NH_3 \rightleftharpoons NH_2NH_2 + H_2$ (2)                 $N_2 + 2H_2 \rightleftharpoons NH_2NH_2$ The first reaction can be caused to occur by feeding ammonia vapor into the outside jacket of a double jacket quartz reactor and enclosing the reactor inside a larger reflecting, steel outer jacket. A continuous power supply with tuning means is provided to maintain a continuous microwave discharge in the area between the outside jacket and the outer walls of the quartz reactor. The frequency of the microwave is tuned to the frequency which causes an excitation of the ammonia molecules. Alternately, the ammonia molecule can be caused to excite by subjecting it to an electrical discharge.

Equimolar quantities of hydrazine and hydrogen are enclosed in the inner jacket of the double jacket quartz reactor, at a pressure of 1 to 2 torr. There are reflecting mirrors on both ends of the central quartz tube which can reflect light of the characteristic wave length corresponding to that emitted by a metastable state of hydrazine, one of the mirrors being partially transmitting to the wave length. The ammonia vapor is fed into the outer quartz jacket and subjected to radiations from $\gamma$-$NH_3$ radiation or electric discharge. The radiation causes the ammonia molecules in vapor phase to excite and start to react.

As soon as the hydrazine starts to form in the reactor, the laser cavity in the center quartz tube starts to emit radiation in the characteristic frequency for hydrazine. That is, energy is ejected, as a laser beam, in the form of simultaneous emission of radiation in the frequency of $\gamma$-$NH_2NH_2$. Because of the relatively fast reaction time the residence time of the reactor is very short. The present invention can be used to greatly increase the throughput or capacity of a conventional reactor with respect to a given chemical reaction.

To increase product purity and yield, the hot product $NH_2NH_2$ and $H_2$ can be transferred to a second similar reactor (or preferably, to a wave reactor) in which is enclosed a laser cavity containing pure hydrazine. A stoichiometric amount of preheated nitrogen is added to allow conversion of the hydrogen to $NH_2NH_2$ by the second reaction shown above. Energy extraction, by the hydrazine laser, prevents degradation of the hydrazine in the reactor and also speeds up the conversion of nitrogen and hydrogen to hydrazine.

The product from the laser reactor can be cooled by expansion or by means of external heat exchanges and recovered. Temperature of the lasing desired product within the laser cavity can also be regulated by means of heat exchange.

Example 2

The alkylation of $C_3$–$C_6$ paraffin (including normal paraffins) with $C_2$–$C_5$ monoolefin or $C_2$–$C_5$ paraffin can be caused to produce a desired product (e.g. isooctane) to the substantial exclusion of the other usual alkylation products when the alkylation reaction (whether thermal or catalytic) is caused to occur in a reactor-laser combination (e.g. a steel reactor which has a highly polished interior surface and which encloses a quartz laser tube containing isooctane vapor diluted with helium). The reactants are preferably preheated to 150–600° C. prior to introduction to the reactor and the partial pressure of the hydrocarbons in the reactor can be in the range of 0.1 to 1000 p.s.i.a. Suspended or vaporized catalyst can be introduced with the hydrocarbon (e.g. HF, HCl, $H_2SO_4$, CHY zeolite, etc.).

The present invention can be used to prepare hydrogen and relatively pure isooctane from two $C_4$ paraffins, as in the following equation:

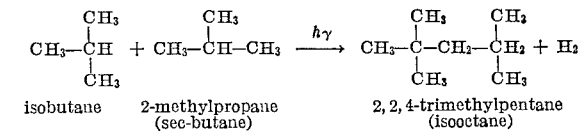

| isobutane | 2-methylpropane (sec-butane) | 2,2,4-trimethylpentane (isooctane) | or, more generally, any acyclic hydrocarbons (and, if necessary additional hydrogen) can be converted to isooctane as by the following equation:

The conventional processes for producing isooctane involve catalytic alkylation of isobutane and butene-1 to form not only isooctane but also virutally every other possible $C_5$ through $C_9$ paraffin. In contrast the present invention allows the production of isooctane (or any other desired hydrocarbon compound) of unusually high purity for a reaction product.

Instead of pure $C_4$ paraffins, vaporized light hydrocarbons such as light petroleum gas can be fed to the outer reactor, and can be excited by heat or electric discharge to cause complete or partial ionization of hydrogen and carbonium ions of free radicals. In the present example, the vaporized isobutane and 2-methylpropane are subjected to electro-magnetic radiation or to a laser beam of specific ultraviolet wave length to cause the local excitation of $\alpha$-hydrogen of the paraffins. Then, by means of the laser tube (inside the reactor) which contains isooctane vapor, the newly formed isooctane in the outer reactor, which is in an electronically excited state, emits energy which is removed from the reactor in the form of laser action by the laser tube containing the isooctane vapor.

That is, the injected energy causes the desired local excitation of $\alpha$-hydrogen and the lasing of excited isooctane removes this specific energy from the system. The effect is similar to that of a molding machine into which molding materials are fed (here, light hydrocarbons, such an isobutane and sec-butane) and by specifying the shape of mold (here allowing only the energy of excited isooctane to exit in the form of laser action) the desired form of product (here isooctane) is obtained.

The energy input to the reactor can be of two main types: discriminating energy, as electronically tuned en- From the foregoing, it may be realized that the process utilized in the wave reactor/laser cavity combination involves at least the following steps: charging of reactant material (e.g. methane and fluorine) into a hollow conduit, charging of high pressure driving gas (e.g. carbon dioxide) into the conduit, removal of driving gas from the conduit, and removal of reaction products (e.g. HF and fluorinated hydrocarbon, such as Freon 12) from the conduit. In some cases, purging or flushing of the conduit (shock tube) might also be involved. The steps described call for some form of valving means (such as those illustrated in the figure) to valve the various materials to and from the reaction conduit in the proper sequence, and at the proper times.

In order to generate a shock wave as desired, the driving gas must be coupled very suddenly (i.e. very rapidly) to the shock tube. This calls for an extremely rapid valving action, such as that which can be achieved with the Hansel tape valve.

One combination of a wave reactor and a laser cavity involves, in combination, a block, an elongated hollow conduit (a shock tube) having one end sealed into said block, and having a laser cavity at the other end; a tubular element having one end sealed into said block in alignment with said one end of said conduit, said element conveying gas under superatmospheric pressure; an imprevious sealing member whose width is large compared to its thickness fitting with small face clearances in a channel provided in said block which channel extends in a direction transverse to the length of said conduit, in a location between said one end of said element and said one end of said conduit, said member having an aperture therein which is arranged to come into registry with said element and said conduit to couple said element to the interior of said conduit; means including said element for applying pneumatic pressure to the front and rear faces of said member to substantially center said member with respect to the front and rear walls of said channel; means for introducing chemical reactants into said conduit; and means for removing reaction product from said conduit.

In the embodiment of FIGS. 9 and 10, a fast acting valve (such as the previously described Hansel tape valve) controls the entry of high pressure gas into a shock resistant, stationary hollow conduit (e.g. a shock tube). The conduit can be fitted with an intake valve (as in FIG. 9) to allow entry of chemical feed materials (e.g. oxygen, nitrogen, chlorine, fluorine) which can react with some of the high pressure gas (e.g. natural gas) or which can interact (e.g. a feed containing isobutane and butene-2 where the high pressure gas is methane). Reaction temperatures can be increased by diluting the driven gas reactants with a gas having a high heat capacity (e.g. argon, neon). The conduit is further fitted with an exhaust valve for removal of hot gases (and entrained liquid or finely divided solid, if present) from the conduit.

The combination of a laser cavity with a wave reactor can be used to produce laser radiation and desired chemical products. For example, methane and nitrogen can be converted to hydrogen cyanide and acetylene by causing the reactants to be rapidly heated, by the shock source, to a temperature of 3500° F., or greater, followed almost immediately by cooling to 1600° F., or less the cooling rate being in the same order of magnitude as the heating rate. The combination can be used as a source of heat energy and laser energy and can involve combustion of a hydrocarbon (e.g. gasoline plus oxygen) or any carbonaceous material, even carbon powder suspended in air.

In the event that only laster radiation, and not a substantially pure chemical product, is desired from the combination of a wave engine and a laser cavity, the laser cavity can be a ruby laser or can contain a finely divided solid suspended in a gas (e.g. MgO in helium—see U.S. Pat. 3,434,072 as to laser emission by optically orientable particles in a gas) rather than a desired product or a substance which emits light of about the same wave length at a desired product.

Where it is desired that a given chemical product be recovered from the wave reactor, such a product can be removed by means of the stop-cock arrangement and vents 80, 81 or 74, 75. Alternately, the laser cavity containing a desired product (or an optically orientable material which can emit laser light of about the same wave length as that emitted by the metastable state of a desired product) can be used to control the products of a given reaction, such as combustion of a hydrocarbon (e.g. gasoline plus oxygen) or any carbonaceous material, even carbon powder suspended in air. Hydrogen and carbon powder can also be reacted to produce hydrocarbons (e.g. acetylene, ethylene, etc.) by initiating the reaction with a laser beam and controlling the reaction product with an enclosed laser cavity containing the desired product.

Similarly ammonia can be produced in the laser-shock reactor combination by causing hot high pressure nitrogen to interact with a hot hydrogen feed.

The combination of a wave reactor and a laser cavity can be particularly useful for conversion of light hydrocarbons (e.g. ethane, ethylene, propane, propylene, butanes, butenes) to higher molecular weight products useful as oils or as gasoline components.

The alkylation of $C_3$-$C_6$ paraffin (including normal paraffins) with $C_2$-$C_5$ monoolefin or $C_2$-$C_5$ paraffin can be caused to produce high yields per pass of isooctane and lower yields of the other usual alkylation products when the alkylation reaction (whether thermal or catalytic) is caused to occur in a reactor (such as those illustrated in the drawings) which has a mirrored interior surface and which encloses a laser cavity containing isooctane vapor. In an enclosed quartz laser tube, the isooctane is preferably diluted with helium. In a wave reactor-laser combination, $C_3$-$C_6$ paraffin (e.g. isobutane) can also be interacted with $C_2$-$C_6$ paraffin (e.g. n-butane) to produce good yields of $C_7$-$C_9$ branched paraffins (e.g. isooctane) and hydrogen.

The yield per pass of 2,2-dimethylbutane (also known as neohexane) by alkylation of isobutane with ethylene can be considerably enhanced (over that which can be obtained by such processes as those of U.S. Pats. 2,209,-450, 2,396,853, 2,104,296, and 2,002,394) when these reactants are introduced in gas phase at a feed ratio in the range of 2 to 40 parts by weight of isobutane per part by weight of ethylene into the wave reactor-laser combination of FIG. 9, and the reaction initiated by a methane, ethane, or natural gas-produced shock wave which can create transitory pressures greater than about 500 p.s.i.g. (preferably 2500–20,000 p.s.i.g.) and transitory temperatures in the range of 300 to 600° C. in the laser cavity. Reasonable yields of 2,2-dimethylbutane can also be obtained by conducting this reaction in the wave reactor per se but the combination with the laser cavity is preferred for this reaction, particularly when the reactants are diluted with a high heat capacity gas (e.g. neon).

Similarly, the yield per pass of 2,2-dimethylpentane from reaction of propylene with isobutane can be increased when the reaction is caused to occur in a wave reactor or in a laser-shock wave reactor combination.

The combination of a wave engine and a laser cavity is particularly useful when the source of the expansion wave is high pressure natural gas and the wave engine is in the vicinity of the gas well. The laser energy produced by the wave engine can be used to drill additional wells.

An added benefit can be derived from the use of laser energy to drill an oil well or gas well is that the reflected energy from the drilling can be monitored and used to analyze the type of formation which the laser is contacting. That is, the amount of reflected energy and the time required for the return of this reflected energy will be determined by the depth of the hole and the type of formation which is being encountered by the laser beam. By correlating the amount of reflected energy and the ergy of prescribed frequency (for example, laser and/or maser irradiation can provide the excitation), or indiscriminating excitation of the reactants, such as by electrical discharge, external heat, a violent, shock wave-producing chemical reaction, etc. A particularly preferred source of energy for excitation of chemical reactions is ultraviolet wave length laser light, which can be selected to excite a specific part of a molecule. In any event, utilizing the laser containing the desired product, the desired product can be obtained in extremely pure form. The reaction occurring in the external reactor can be caused to produce a desired product in highly pure form and in high yield per pass.

Example 3

A shock wave reactor or a combination of a laser cavity and a shock wave reactor can be used to produce 2,2-dimethylbutane or 2,2-dimethylpentane in good yields per pass by alkylation of ethylene or propylene with isobutane. The reactants are preferably preheated to 150–550° C. introduced as the driven gas in the wave reactor. The driver gas can be one or both of the reactants or can be any gas which will not produce undesired side products and which can be economically separated from the reaction product and recycled. The yield per pass and/or the production of laser energy, for the same conditions of temperature and pressure of the driver and driven gases, can be increased by addition or substitution of 5–95% of a monatomic gas (e.g. argon, neon, xenon) in the feed in the driven section.

In the above example, when both the driver and driven gases are at 800° F., the peak pressure is about 3000 p.s.i.a., the peak temperature about 1400° F. and the yield per pass about 25%.

The conduit portion of the wave reactor of FIGS. 7 and 8 is purged with flowing isobutane (which has been preheated to 300° C.), introduced via intake vents 80 and 81 (with vents 74 and 75 open), until the conduit contains substantially pure isobutane at 15 p.s.i.a. and 300° C. Then vent 75 is closed, by means of the stop cock 76, and ethylene, preheated to 500° F. (260° C.), is added (via vents 80 and 81) until the pressure of the gases in the conduit is 25 p.s.i.a., at which point vent 81 is closed by means of stop cock 82. Hot, high pressure isobutane (500 p.s.i.a., 300° C.) is then caused to suddenly enter the conduit by activation of the tape valve 66.

The resulting shock wave causes thermal alkylation of the isobutane and ethylene, and laser light 63 is emitted from the laser cavity 62 (which is a cylindrical quartz enclosure with mirrored ends and containing a mixture of helium and 2,2-dimethylbutane).

The gases are then removed from the conduit by opening stop cock 76 and connecting vent 75 (e.g. to an evacuated vessel, not shown), a knockout drum and flash condensor which flash cools the gases to obtain a liquid product which is collected. The gases can be recycled. Vapor phase chromatographic analysis shows that 2,2-dimethylbutane is present in the collected liquid product. The liquid per pass is about 15% based on the ethylene. The yield can be increased by utilizing multiple shocks prior to removal of the product from the reactor.

Similarly, 2,2-dimethylbutane can be produced by causing ethylene and isobutane to react in the combination illustrated in FIGS. 9 and 10.

In a similar manner, 2,2-dimethylpentane can be produced, in either reactor system, by substitution of propylene for ethylene.

Example 4

In the combustion process in an internal combustion engine, incomplete combustion of hydrocarbons and air will result in undesirable products such as oxides of nitrogen, aldehydes, acetones, carbon monoxide, etc. By placing a carbon dioxide laser tube in the combustion chamber of an internal combustion engine (as through a spark-plug port), the combustion products can be directed more completely toward carbon dioxide rather than carbon monoxide or partially burned hydrocarbons, and the shock wave and light produced in the combustion can be converted to laser energy. In this embodiment, a hydrogen deficient fuel (such as liquefied coal) is a preferred fuel, since less water is produced and, thus, more energy is available to excite the lasing $CO_2$.

Example 5

Hydrocarbonaceous material, such as Athabasca tar residue, bitumen, asphalt, oil-shale, or coal, can be converted to ammonia by reaction with nitrogen in a reflective reactor containing a laser cavity in which ammonia is enclosed.

The coke produced by such conventional processes is not usually completely free of hydrogen, (typically, such coke contains 0.5–2 wt. percent H); therefore, upon combustion such coke will produce water and this water will reduce the efficiency of the conversion of the reaction energy into laser light. However, when the combustion of the coke is effected in a reactor similar to that of FIG. 5 and the laser enclosures contain $CO_2$ and $H_2$ (or, alternatively, some enclosures can contain $CO_2$ and some can contain $H_2$ or $H_2$ and $CO_2$), the production of water during the combustion (or coke oxidation) can be substantially reduced.

The source of coke for the process of the present example can be tar residue obtained from the retorting of bitumen extracted from Athabasca tar sands. The heat from the combustion can be used to make steam or electricity and the laser energy can be used to mine additional tar sands. Such laser mining can be particularly useful in the winter when the tar sands are frozen and difficult to mine.

The invention claimed is:

1. A chemical reactor vessel containing a laser cavity and means for generating a chemical reaction, a shock wave and electromagnetic energy, said vessel comprising a shock conduit and said generating means at one end of said conduit, said generating means having means for introducing a chemical reactant into said vesel, said vessel containing, at the end of said conduit opposed to said generating means, means for removing a reaction product from said vessel said vessel having an interior surface which is highly reflective to electromagnetic energy and said laser cavity being coupled to said reactor whereby to enable the irradiation of said laser cavity by electromagnetic energy reflected from said surface and produced by said generating means and wherein the end portion of said shock conduit which is opposed to said generating means is mirrored on two opposing sides, one said side being partially transmitting, thereby permitting said end portion to function as a laser cavity, said end portion containing closure means for producing a reflected shock wave, said end portion being a closure member and, perpendicularly opposed to said closure member, two opposed reflective side-wall portions attached to the end of said conduit and said closure member, and wherein said generating means include a tape valve to valve the various materials to and from the reaction conduit in proper sequence and at the proper times, said tape valve comprising an impervious tape and means for driving said tape at a high velocity between two aligned portions of a gas flow passage in said vessel and transversely with respect to the length of said passage, said tape having an aperture therein which can come into registry with the two said passage portions to permit communication therebetween for opening of the valve and means for maintaining said tape centered in a small gap between the two said passage portions, as the tape moves, said means involving the application of oppositely-directed gas pressures to the respective opposite faces of said tape.

2. The combination of claim 1 wherein there is included means for controlling the temperature of the desired product within the laser cavity.

3. The combination of claim 2 wherein said means for controlling the temperature include a heat exchange conduit in heat exchanging relationship to said cavity and having a mirrored external surface.

References Cited

UNITED STATES PATENTS 3,300,283   1/1967   Lauer et al. _____ 23—284

JAMES H. TAYMAN, Jr., Primary Examiner

U.S. Cl. X.R.

204—158 R, DIG. 11, 163, 159.23; 260—679 R; 73—151.5; 23—288 S; 331—94.5